(12) United States Patent
Kleeberger et al.

(10) Patent No.: US 10,664,139 B2
(45) Date of Patent: May 26, 2020

(54) DISPLAY AND INTERFACE FOR DRIVER ASSISTANCE APPARATUS IN A MOTOR VEHICLE

(71) Applicant: Volkswagen AG, Wolfsburg (DE)

(72) Inventors: Julia Kleeberger, Berlin (DE); Christoph Waeller, Braunschweig (DE); Mike Salzer, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 307 days.

(21) Appl. No.: 13/845,863

(22) Filed: Mar. 18, 2013

(65) Prior Publication Data

US 2013/0219318 A1  Aug. 22, 2013

Related U.S. Application Data

(63) Continuation of application No. PCT/EP2011/003723, filed on Jul. 25, 2011.

(30) Foreign Application Priority Data

Sep. 18, 2010  (DE) .................. 10 2010 045 974

(51) Int. Cl.
*G06F 3/048* (2013.01)
*G06F 3/0484* (2013.01)
(Continued)

(52) U.S. Cl.
CPC ............ *G06F 3/0484* (2013.01); *B60K 35/00* (2013.01); *B60K 37/06* (2013.01); *G01C 21/367* (2013.01);
(Continued)

(58) Field of Classification Search
CPC .. G06F 3/0484; G06F 3/04847; G06F 3/0482; B60K 35/00; B60K 37/06;
(Continued)

(56) References Cited

U.S. PATENT DOCUMENTS 6,181,344 B1 * 1/2001 Tarpenning ........... G06F 1/1626
715/825
7,149,653 B2  12/2006 Bihler et al.
(Continued)

FOREIGN PATENT DOCUMENTS

CN    1704886 A    12/2005
CN    1902576 A    1/2007
(Continued)

OTHER PUBLICATIONS

Heise Online, "Google Earth fuers iPhone," http://www.heise.de/mobil/meldung/Google-Earth-fuers-iPhone-213615.html, p. 1 with English translation (Oct. 27, 2008).
(Continued)

*Primary Examiner* — Kieu D Vu
*Assistant Examiner* — Asteway T Gattew
(74) *Attorney, Agent, or Firm* — Muncy, Geissler, Olds & Lowe, P.C.

(57) ABSTRACT

A display and operator control apparatus in a motor vehicle, which display and control apparatus can be used at least to display information from various driver assistance systems and to select functions which are associated with these driver assistance systems. At least one mode of operation in which a digital map display with specific display parameters is displayed and, in the process, at least one function can be selected. A changeover in respect of the possibility to select at least one other function can be activated and this changeover is not made from a fundamental basic display to the user even when a changeover is made between selectable functions, which may be separately displayed via buttons. Only one or more display parameters are changed, and therefore the display to the user can be adapted in an optimum manner.

13 Claims, 5 Drawing Sheets

(51) Int. Cl.
    *B60K 35/00*     (2006.01)
    *B60K 37/06*     (2006.01)
    *G01C 21/36*     (2006.01)

(52) U.S. Cl.
CPC ...... *G01C 21/3664* (2013.01); *B60K 2370/11* (2019.05); *B60K 2370/1442* (2019.05); *B60K 2370/1868* (2019.05); *B60K 2370/193* (2019.05)

(58) Field of Classification Search
CPC .... B60K 2350/1004; B60K 2350/1032; B60K 2350/962; B60K 2350/965; B60K 2370/11; B60K 2370/193; B60K 2370/1868; B60K 2370/1442; G01C 21/3664; G01C 21/367
See application file for complete search history.

(56) References Cited

U.S. PATENT DOCUMENTS

| | | | | |
|---|---|---|---|---|
| 7,395,089 | B1* | 7/2008 | Hawkins | H04M 1/0245 455/556.1 |
| 8,862,308 | B2 | 10/2014 | Kuenzner | |
| 2002/0149586 | A1* | 10/2002 | Maeda | G01C 21/3635 345/440 |
| 2003/0018427 | A1* | 1/2003 | Yokota et al. | 701/208 |
| 2005/0283079 | A1* | 12/2005 | Steen | A61B 8/14 600/447 |
| 2006/0066628 | A1* | 3/2006 | Brodie et al. | 345/594 |
| 2006/0173615 | A1* | 8/2006 | Pinkus | G01C 21/362 701/454 |
| 2007/0010942 | A1* | 1/2007 | Bill | G01C 21/3617 701/424 |
| 2007/0067103 | A1* | 3/2007 | Fukumoto | G01C 21/3638 701/436 |
| 2007/0126698 | A1* | 6/2007 | Iwamoto et al. | 345/156 |
| 2007/0245264 | A1* | 10/2007 | Hoerentrup | G06F 3/0482 715/835 |
| 2009/0018776 | A1* | 1/2009 | Taylor | 702/19 |
| 2009/0150156 | A1* | 6/2009 | Kennewick | G06Q 30/0261 704/257 |
| 2009/0192703 | A1 | 7/2009 | Hess et al. | |
| 2009/0198767 | A1* | 8/2009 | Jakobson | G01C 21/3679 709/203 |
| 2009/0228839 | A1* | 9/2009 | Iga | 715/853 |
| 2010/0228474 | A1* | 9/2010 | Paterson | G01C 21/20 701/532 |
| 2010/0283743 | A1* | 11/2010 | Coddington | G06F 3/0485 345/173 |
| 2010/0312466 | A1* | 12/2010 | Katzer | G01C 21/3492 701/533 |
| 2011/0004822 | A1* | 1/2011 | Nezu et al. | 715/702 |
| 2015/0012941 | A1 | 1/2015 | Nezu et al. | |

FOREIGN PATENT DOCUMENTS

| | | |
|---|---|---|
| DE | 100 52 654 A1 | 5/2002 |
| DE | 101 53 987 A1 | 5/2003 |
| DE | 10 2005 004 202 A1 | 8/2006 |
| DE | 10 2007 051 013 A1 | 4/2009 |
| DE | 10 2007 054 875 A1 | 5/2009 |
| DE | 10 2009 045 936 A1 | 4/2010 |
| EP | 2 063 226 A2 | 5/2009 |
| EP | 2 196 773 A1 | 6/2010 |

OTHER PUBLICATIONS

Chinese Office Action for Chinese Application No. 2011800556074 dated Oct. 17, 2016—English translation.

Navigon User's Manual at http://www.navigon.com/portal/common/Download/Manual/PNA/Navigon831/Deutsch_manual.jpg, pp. 1-92 (May 2009).

* cited by examiner

| Step | Zoom level Z (scale) | View (m/pixel) |
|---|---|---|
| 1 | 1 : 4,000,000 | About 1220 |
| 2 | 1 : 1,000,000 | About 306 |
| 3 | 1 : 250,000 | About 76 |
| 4 | 1 : 8000 | About 2.4 |
| 5 | 1 : 4000 | About 1.2 |
| 6 | 1 : 2000 | About 0.6 |

FIG. 4

| Step | Tilt level N | View (perspective) |
|---|---|---|
| 1 | 0° | rectangle |
| 2 | | |
| 3 | | |
| 4 | 35° | trapezoid |
| 5 | 50° | trapezoid |
| 6 | 75° | trapezoid |

FIG. 5

| Step | Detail level (landmarks) |
|---|---|
| 1 | schematic |
| 2 | illustrative with graphical impression |
| 3 | illustrative with realistic impression |

FIG. 6

DISPLAY AND INTERFACE FOR DRIVER ASSISTANCE APPARATUS IN A MOTOR VEHICLE

This nonprovisional application is a continuation of International Application No. PCT/EP2011/003723, which was filed on Jul. 25, 2011, and which claims priority to German Patent Application No. DE 10 2010 045 974.7, which was filed in Germany on Sep. 18, 2010, and which are both herein incorporated by reference.

BACKGROUND OF THE INVENTION

Field of the Invention

The invention relates to a display and operating device in a motor vehicle, which device can be used at least for displaying information from different driver assistance systems and for selecting functions associated with said driver assistance systems.

Description of the Background Art

The term "driver assistance systems" can be understood broadly and are intended to support the driver in all traffic situations and enable relaxed and stress- and accident-free driving for the driver. Depending on use, a distinction is to be made in this regard between driver information systems (e.g., navigation and traffic reports), vehicle communication systems (e.g., vehicle/vehicle communication or communication between vehicles and infrastructure facilities), driver assistance systems for vehicle stabilization (e.g., anti-lock braking system ABS, electronic stabilization program ESP, and others), predictive driver assistance systems, which scan the vehicle surroundings with the help of omnidirectional vision sensors (e.g., parking assistance systems, adaptive cruise control ACC, and the like), and also driver's state recognition systems for an adaptive design of warnings and vehicle interventions.

A variety of driver assistance systems already occasionally used in current motor vehicles, however, often entails fundamental changes in the display of the information on generic display and operating devices for the user. For example, the displays and settings for driver assistance systems are not all shown on a digital navigation map, but often in a separate depiction of the surroundings. Thus, for the most part, there are different representations of the vehicle environment in HMI (Human-Machine Interface), which use different information encoding and operating principles. This is detrimental to user-friendliness.

It is known from the conventional art to prepare and display information or selectable functions of driver assistance systems according to the situation in order to distract the vehicle driver less greatly from the traffic situation.

Thus, for example, DE 100 52 654 A1, which is incorporated herein by reference, describes a method for controlling optical and acoustic information in a motor vehicle, in which method a driving situation detection is carried out depending on the data from driver assistance systems, and depending on this detection optical or acoustic information is provided, delayed, temporarily stored, or suppressed.

DE 101 53 987 A1, which corresponds to U.S. Pat. No. 7,149,653, discloses an information system in a vehicle which generates information to be output depending on the driver's behavior or state.

Further, in current navigation systems the digital map is linked only with the function of destination guidance. If destination guidance is deactivated, the map shows the current position of the vehicle (vehicle cursor), and when destination guidance is active, information on the routes is shown. It is known in this regard to adjust the display as a function of the route (so-called intersection zoom).

Current navigation systems, moreover, allow the display of points of interest (POIs) on the navigation map, therefore, if applicable interesting or prominent points. In order not to display too many POIs simultaneously in a display detail, these are usually divided into categories (e.g., restaurants, gas stations, etc.), which must be selected separately, e.g., via a menu.

SUMMARY OF THE INVENTION

It is therefore an object of the present invention to provide a display and operating device in a motor vehicle, which device is improved with respect to its user-friendliness.

In an embodiment, the invention is based on a display and operating device in a motor vehicle, which device can be used at least for displaying information from different driver assistance systems and for selecting functions associated with the driver assistance systems.

It is entirely possible that the display and operating device can also be used for other functions not associated with the driver assistance systems, for example, audio or climate control functions.

It is now provided according to an embodiment of the invention that the display and operating device has at least one operating mode in which a digital map display is shown with specific display parameters and at least one function can be enabled, whereby a changeover to the enablement of at least one other function can be activated and this changeover results in a change of at least one display parameter of the digital map display.

Therefore, a departure from a fundamental basic display (digital map) does not occur for the user when there is a changeover of selectable functions (possibly displayed separately via buttons). Only one or more display parameters are changed, so that the display for the user in regard to the selectable functions can be adjusted optimally and the user need not familiarize himself with a fundamentally different display.

A good adjustment of the display can be achieved when a changeover to the enablement of at least one other function results in a change of the zoom, tilt, and/or detail level of the digital map display, although changing other display parameters is also conceivable.

If, for example, a navigation system is activated with the display and operating device, thus a correspondingly enable function or selectable functions for further operation of the navigation system together with a digital map with low zoom level (as an overview map) could be shown. The changeover to the enablement of at least one other function could then be accompanied by a display of the map with a high zoom level.

The setting of the display parameter "zoom level" is possible in different steps. A low zoom step could be assigned, for example, a scale on the map display of 1:4,000,000, which on a display surface of the display and operating device would correspond to a distance of about 1200 m per pixel. In contrast, for a high zoom step, for example, a scale of 1:2000 on the digital map display can be selected, which would correspond to a distance of about 0.6 m per pixel on the display surface.

The display parameter "tilt level" is taken to mean the angle of an imaginary camera at which the camera records the digital map from the selected height (zoom level).

The zoom and tilt level typically have a relationship to one another. Thus, a low zoom level for the most part also results in a low tilt level, but a high zoom level for the most part also results in a high tilt level.

The display parameter "detail level" can relate to landmarks (e.g., buildings or well-known structures), streets, and also regions. Thus, a low detail level, for example, in the case of buildings would only result in their schematic representation and a high detail level in their representation with a more realistic appearance.

It can definitely be advantageous, however, when the user can set at least one display parameter assigned to the enablement of at least one function (particularly the zoom, detail, and/or tilt level). This makes possible a high user-specific flexibility.

On the other hand, it is entirely expedient, however, when at least two display parameters (for example, zoom and tilt level) have a fixed relationship to one another in such a way that the setting of the one display parameter results in at least the adjustment of the other display parameter. Thus, according to an embodiment of the invention, the most suitable relationship between the display parameters can be selected and used as the basis for the system, so that the user is not overloaded with settable parameters.

It is also suitable in the display and operating device to display a number of selectable functions as a function group, whereby at least one changeover between the display of the functions or between the selectability of the functions of two different function groups is possible. This leads to a clear functional structure easily comprehensible for the user: Thus, for example, a function group associated with the navigation system with the selectable functions "selection of an already existing route," "creation of a new route," "combining of existing routes," and "dividing existing routes" could be provided. The function group can be assigned, for example, the description "route planning." Each such function group can also be understood as an "interaction level," which always overlays or is assigned a map display and in which the user can enable one or more functions.

A changeover from the display or selectability of the functions associated with the function group "route planning" to those of another function group, for example, "POI display" is possible by appropriate operation of the display and operating device. The function group "POI display" can comprise, for example, the functions "select POI category" and "POI detail editing."

A changeover between function groups or interaction levels now simultaneously results in the adjustment of digital map displays associated with these. Thus, for example, during a changeover from the function group "route planning" to the function group "POI display," a change in the zoom, tilt, and also detail level of the map will also result, depending on the display parameters linked to the individual function groups.

It is an expedient option to make different function groups displayable via buttons assigned to these function groups. This enables a rapid selection of the particular function groups.

In this regard, the buttons assigned to the function groups can also be designed additionally as freely assignable favorites buttons. This enables especially rapid access to function groups preferred by the user, without the user having to go through possible menus.

It is possible that in the case of the display and operating device at least one touch-sensitive surface is provided on which the buttons assigned to the function groups can be displayed by pressing a menu button and activated by touch. The touch-sensitive surface can be designed preferably as a touch screen. Very comfortable operation of the display and operating device is possible in this way. Whereas the buttons assigned to the function groups may be displayed as "soft keys" on the touchscreen, the menu button is preferably designed as a "true" hardware-based button.

As already mentioned, the function groups or interaction levels can also be selected via the freely assignable favorites buttons. An appropriate assignment of these favorites buttons could occur, for example, by means of a "drag & drop" function, in that a finger is kept on the button of a function group and moves it to the assigned favorites button.

After activation of the buttons assigned to the function groups, the specifically selectable functions of a function group can be activated by the on-screen buttons displayed on the touch-sensitive surface.

Moreover, a button can expediently be provided upon whose actuation only a display of the digital map without overlaid selectable functions of a function group takes place. This button can be designed as soft key and/or also as selected hardware-based button. When necessary the user is thereby then rapidly enabled to allow for a "base map display" to be shown on the display and operating device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 shows an exemplary tabular illustration of the possible gradation of a display parameter (zoom level);

FIG. 5 shows a tabular illustration of the possible gradation of a second display parameter (tilt level);

FIG. 6 shows a tabular illustration of the possible gradation of another display parameter (detail level);

DETAILED DESCRIPTION

Figure 1:
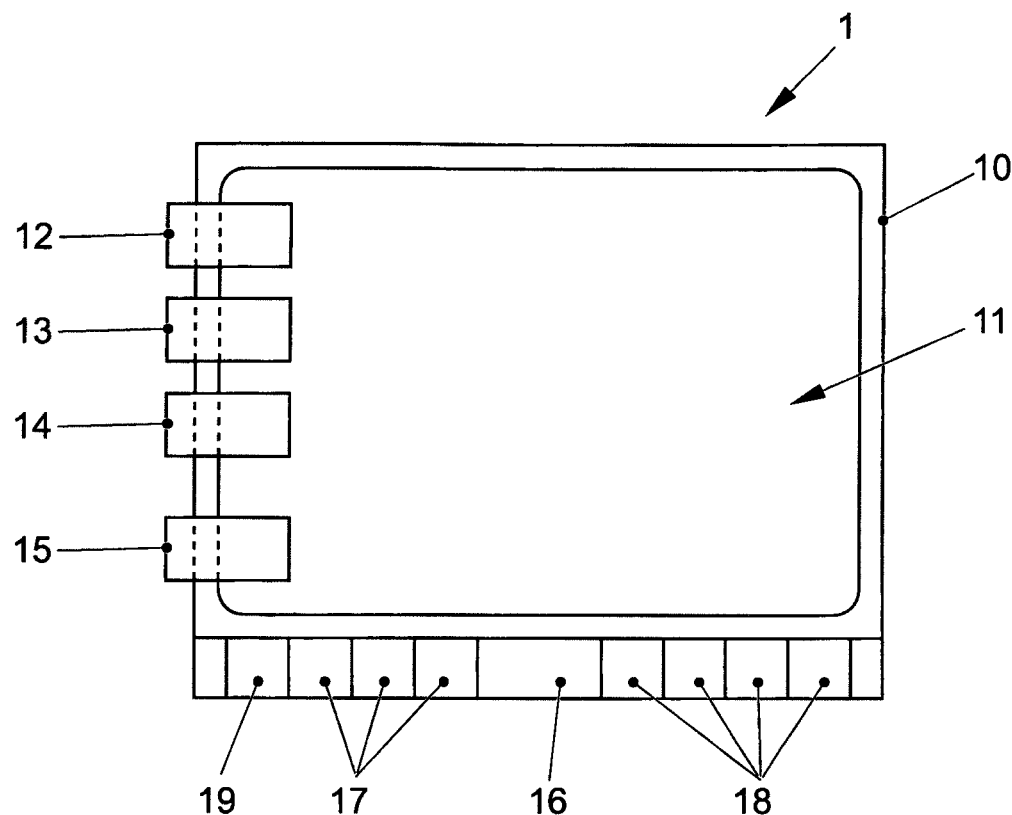
FIG. 1 shows a principal plan view of a display and operating device according to the invention.
Figure 2:
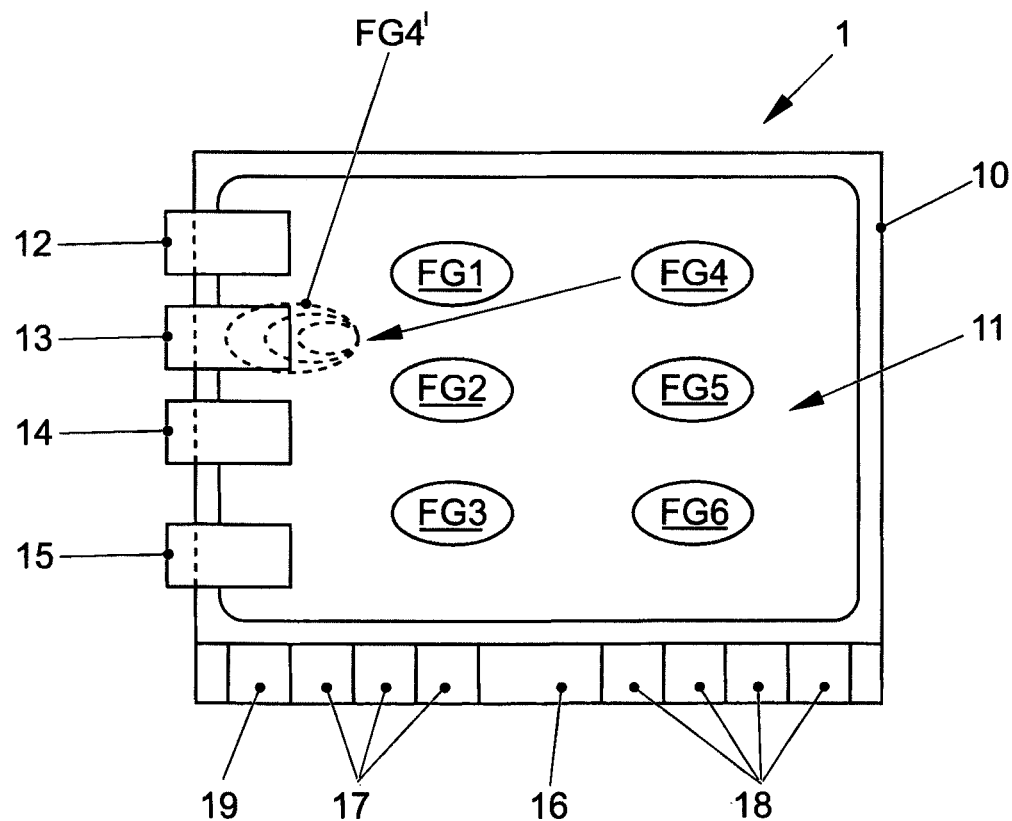
FIG. 2 shows a view comparable to FIG. 1, whereby a menu for selecting different function groups is shown on the display surface.

Reference is made first to FIGS. 1 and 2. A display and operating device 1 can be seen in FIG. 1, which is installed in a motor vehicle that is not shown in greater detail. A preferred installation location can be, for example, in the area of the center console or the instrument panel of the motor vehicle. Display and operating device 1 has a signal-conducting, logical connection to various driver assistance systems, particularly to a navigation system, a vehicle communication system, a parking assist system, and a collision warning system. The signal-conducting, logical connection will not be explained more closely in detail, because it is not essential to understanding the invention.

Display and operating device 1 has a housing 10, which on its left side is provided with favorites buttons 12, 13, and 14 freely assignable in their function. A default button 15 is provided below the favorites button 14. Buttons 12 to 15 are designed as toggle switches and are transparent, whereby switches 12 to 15 are positioned with most of their body over a touch-sensitive surface 11 in the form of a touch screen.

In the bottom area of housing 10, namely, below touch screen 11, a menu button 16 is located in the center, whereby audio buttons 17 for radio functions are located to the left of said menu button and audio buttons 18 for CD and Aux functions to its right. Further, a power switch 19 for turning display and operating device 1 on and off can be seen.

When display and operating device 1 is on, a menu can be displayed via menu button 16 on touch screen 11, on which function groups FG1 to FG6 available to the user can be seen (cf. FIG. 2). Each function group FG1 to FG6 comprises at least one function but typically a number of functions, which can be associated topic-specifically within a driver assistance system.

Function groups FG1 to FG6 are assigned the following topics on touch screen 11 as displayed on-screen buttons in plain text (displayed symbols are also conceivable):

FG1=route planning, FG2=POI display, FG3=parking, FG4=temporary events, FG5=immediate vehicle environment; FG6=favorites map.

If function groups beyond these exist or are necessary, these can be easily shown by a scrolling function known per se.

If the user now selects one of the function groups FG1 to FG6 by touching the corresponding menu point, the view changes to another display, the principal operation of which will now be explained in greater detail with the use of FIG. 3.

Figure 3:
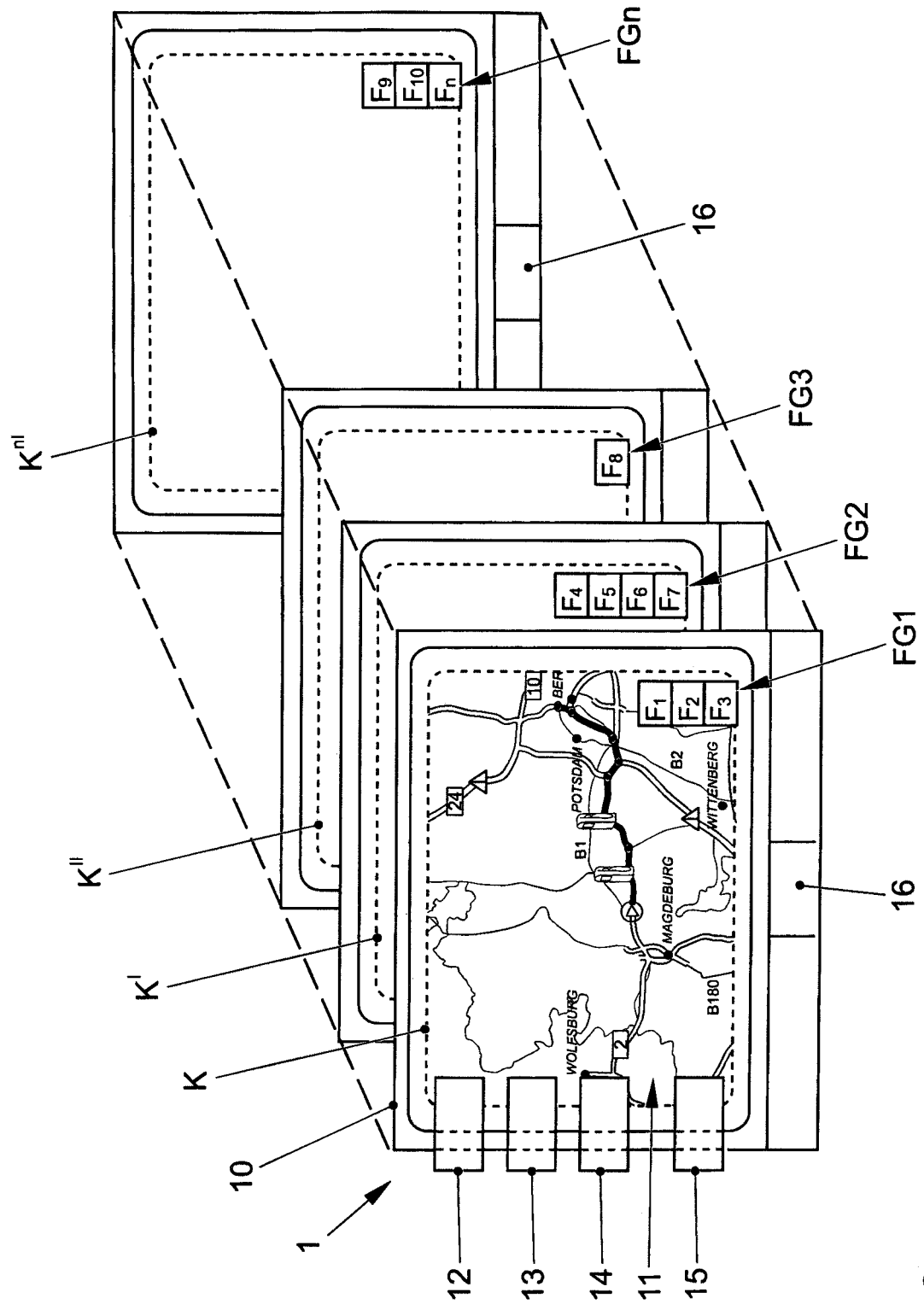
FIG. 3 shows a principal illustration of an essential functional principle of the display and operating device of the invention.

FIG. 3 shows different screen images indicated by the lateral offset, as they would appear upon selection of one of the function groups FG1 to FG6 on touch screen 11 of display and operating device 1. For the sake of clarity, buttons 17 and 18, assigned to audio functions, and power button 19 are no longer shown.

If the user now touches one of the function groups displayed as on-screen buttons from the menu (compare FIG. 2), depending on the selected function group on touch screen 11 one of the images K to K$^{n'}$ of the digital map appears together with one of the selectable or activatable functions F1 to Fn, which are assigned to a function group and are shown in the form of on-screen buttons. The map displays K to K$^{n'}$ each differ in the value of at least one of its display parameters, thus, for example, in the zoom level, tilt level, and/or detail level.

Because, as already mentioned, it is entirely possible that more than the shown six function groups FG1 and FG6 can be called up, this is indicated in FIG. 3 by the variable N (cf. K$^{n'}$, FGn, and Fn).

If, for example, the function group or interaction level FG1 is selected, a digital map K appears, which is assigned specific display parameters. The essential display parameters in this case are a specific zoom level Z (compare FIG. 4), a specific tilt level N (compare FIG. 5), and a specific detail level D (compare FIG. 6). The individual display parameters will be taken up further below.

Together with the digital map K, the selectable functions F1 to F3, assigned to function group FG1 (route planning), are now shown as on-screen buttons on touch screen 11. Thus, for example, the assignment of on-screen buttons F1 to F3 with functions F1=create route, F2=view route, and F3=preview destination is conceivable. It is possible in selecting the function F1 to draw new routes by the user's own finger movements directly on the touch screen. In this regard, for example, a query can be made beforehand with a context menu assigned to function F1 whether a new route is to occur alphanumerically by inputting the starting point and destination or by said drawing on the map K itself.

It is conceivable in the selection of function F2 that a specific (possibly settable) number of previously driven routes (graphically differentiable) are displayed, whereby individual routes can be selected by appropriate touching. In the selection of a route the display of a context menu is again conceivable with the functions "further information" (route conditions, differences in time and fuel consumption relative to other routes, etc.), "use as new route," or also "edit route." The option can be again provided for this to divide a route as desired and to use one or more sections as the new route. It can be conceivable further that in the mentioned context menu an additional function "join routes" is offered in which by the user's finger movements particularly on map K routes that are close together are selected and used as the new navigation route. Of course, it is possible that a reasonable suggestion by the navigation system is shown beforehand, for example, graphically.

In the selection of function F3, only the destination area is indicated, whereby in addition a display of local weather information is conceivable.

The following displays are useful as additional displays on map K: alternative routes (fastest, most economic, safest, most comfortable); traffic delays; traffic density; range (fuel tank level or battery status in electric vehicles)

As already mentioned, each selectable function group FG1 to FGn is assigned accordingly one of the maps K to K$^{n'}$, whose display parameters, zoom level Z, tilt level N, and detail level D, have specific values. Possible settable values will now be explained in greater detail with the use of FIGS. 4 to 6.

Thus, a zoom level Z with the gradations 1 to 6 is provided in the exemplary embodiment, whereby step 1 has the lowest zoom level (scale of 1:4,000,000) and step 6 the highest zoom level (scale of 1:2000). Step 1 corresponds here to a view on touch screen 11 of approximately 1220 meters per pixel, but step 6 to a view of about 0.6 meters per pixel. The intermediate values can be obtained from the table in FIG. 4.

For the tilt level N as well, six steps are provided in the exemplary embodiment (compare FIG. 5). The tilt level corresponds here to an imaginary camera angle of a camera positioned in a bird's eye perspective. Thus, tilt steps 1 to 3 correspond to a tilt level of 0 degrees. Step 6, in contrast, is assigned a tilt level of 75 degrees, whereby in the right column of the table the perspective distortion corresponding to the tilt level is indicated.

In FIG. 6, finally the detail level D is shown by way of example for landmarks. Landmarks can be local landmarks, therefore individual buildings on a street, or also global landmarks (prominent or known structures), for example, the Braunschweig lion (Brunswick lion), the Brandenburg Gate in Berlin, or the Eiffel Tower in Paris, which can be used as a symbol for the cities.

As is evident, three steps for the detail level for landmarks are provided. Thus, landmarks or buildings in step 1 are shown only schematically as line drawings, whereas in step 2 they are already shown illustratively with a graphical appearance. Here, for example, the roof surfaces are shown darker than the wall surfaces of a building. In step 3, an illustrative depiction with a realistic appearance is provided. In this regard, in addition, for example, individual stories and windows of the buildings are visible. The detail level D is shown here only by way of example for landmarks, but it also relates to streets and regions, whereby the detail level in the case of streets can be varied substantially in their stroke width and color and the detail level in regions substantially with respect to the texture of their depiction.

It should be noted that in particular a specific relation between the zoom level Z and the tilt level N (perspective) has proven advantageous for the display. This relation in the exemplary embodiment is therefore initially predetermined by the system first, but can also be set by the user if necessary.

Thus, both zoom level Z and tilt level N each have six steps, whereby in a map display a set step 1 in zoom level Z is assigned the values of step 1 of tilt level N. Step 2 in zoom level Z is assigned the values of step 2 of tilt level N, etc.

In the selected function group FG1 (route planning), the digital map K is now assigned the display parameters zoom level Z=1 and tilt level N=1.

The user now has the following options for selecting another function group (interaction level): (A) by pressing the menu button 16 the user again gets to the menu display (compare FIG. 2). From this menu, he can select one of the function groups FG1 to FG6 in the already described manner; and/or (B) the user can press one of the favorites buttons 12 to 14 assigned a preferred or often used function group and thus gets directly to another function group. To do this, however, he must have assigned previously an appropriate function group from the menu (compare FIG. 2) to the favorites buttons 12 to 14. This is possible by a simple drag & drop function, as indicated by the arrow in FIG. 2. For example, the user needs to drag, only the symbol or plain text of function group FG4 with a finger to the edge of the favorites button, for example, favorites button 13, to be assigned this function group (cf. FG4'). If the distance to this button falls below a defined distance, the symbol or the plain text is automatically placed "under" the corresponding favorites button and is visible through the transparently designed favorites button. The symbol possibly indicated thus far at this position disappears or goes back, for example, to the original position of the symbol, moved by the user, in the menu display.

Thus, a very rapid changeover at least between selected function groups of the function groups FG1 to FG6 is possible by means of favorites buttons 12 to 14. Although in the exemplary embodiment only three such favorites buttons 12 to 14 are shown, naturally a different number of such favorites buttons is also conceivable as needed.

If proceeding from function group FG1 the user selects, for example, function group FG2 via one of the favorites buttons 12 to 14, a change in at least one display parameter occurs (zoom level Z, tilt level N, and/or detail level D) for a digital map K'. At the same time, selectable functions F4 to F7 are shown on touch screen 11. Function group 2 is assigned functions for the POI display (POI=point of interest). Specifically, zoom level Z in steps 4, 5, or 6 is provided here. Accordingly, a tilt level N in steps 4, 5, or 6 is also associated therewith. Functions F4 to F7 are again designed as corresponding on-screen buttons and can be selected by touching. It is possible in selecting a function that a context menu with other subfunctions opens upon touching.

Thus, function F4, for example, can be assigned the function "selection of POI category." If the on-screen button is touched, a context menu opens with selectable POI categories, for example, businesses (stores and services), mobility (vehicle, airport, navigation, train stations, lodging, etc.), leisure time (sports, recreation, art, culture, going out, etc.), facilities (public, religious, post office, money, telephony, healthcare, etc.), and eating and drinking (restaurants, cafes, pubs, bars, snack-bars, ice-cream parlors, etc.).

It may be expedient under circumstances, for example, in emergencies, when one of the selectable functions F4 to F7, or if necessary another on-screen button that can be added, is designed as an "emergency button" with which hospitals and/or doctors are displayed as a POI (without having to go through the POI category selection). In a similar way, it is conceivable to fixedly assign such a function to a hardware-based button (comparable to favorites buttons 12 to 14 or default button 15).

It should be noted that also the POIs indicated on map K' represent on-screen buttons that can be selected by touching touch screen 11. Upon touching, a corresponding context menu opens which, for example, can contain the points "further information," "use as navigation destination," "show similar POIs," "leave comment," and/or "flag for favorites map."

To be able to leave a comment for another traffic participant as well, the function "leave comment" naturally requires a corresponding vehicle communication system (car-to-car communication), with which display and operating device 1 has a signaling or logical connection.

If a POI is "flagged for the favorites map," this POI is always displayed in addition to other information by selecting the function group FG6 (favorites map), which will be described below.

Still other displays are naturally conceivable in function group FG2, thus, e.g.: where is there heavy people traffic? where are my friends? where are there people with similar interests? mood barometer; weather; interesting routes; insider tips; graffiti art; and the like Such additional displays can also be shown as POIs on the map and be selected with the context menu already described.

When the function group FG3 (parking) is selected from the menu (compare FIG. 2) or by one of the favorites buttons 12 to 14, this changeover again results in a change of at least one display parameter of the digital map display. Thus, together with the function group FG3, a digital map K" with a zoom level Z in step 5 or also 6 is shown. In association with this, a perspective display is provided with a tilt level N in step 5 or 6. Therefore, in contrast to the overview display by the selection of function group FG1 (route planning, cf. FIG. 7), the immediate vicinity of the vehicle is shown when selecting function group FG3. In addition, parking lots 23 or parking garages 24 in the vicinity are displayed (cf. FIG. 8).

It should be noted that the functions selectable together with one of the map displays K to K"' need not necessarily be shown explicitly as on-screen buttons according to the type of functions F1 to Fn, but that it is also possible to make such functions selectable by touching appropriate symbols on the map itself. Thus, on digital maps K" the indicated parking garages 24 or parking lots 23 can be enabled directly as on-screen buttons on touch screen 11. Upon touching, a context menu with selectable functions opens, such as, for example, "navigate to selected parking lot" or "distance to destination." As already described, streets indicated on the map K can be assigned functions and therefore understood essentially as selectable functions.

It is conceivable in addition to display a function F8 (search for free parking lots) as on-screen selection buttons. In selecting this function, only parking garages 24 or parking lots 23 with parking spaces reported as free are shown on map K". Upon touching a parking garage 24 or a parking lot 23, the display of a context menu with the display of an additional function "reserve/book parking space" occurs in a similar way.

If the user selects the function group FG5 (immediate vehicle vicinity), the function group is also assigned a specific, preset value of the digital map display parameters (zoom level Z, tilt level N, and detail level D). Preferably, if function group FG5 is selected, the digital map is displayed with a zoom level Z in step 6 or a still higher zoom step, in which the immediate vehicle vicinity can be depicted. In this case, the range of the vehicle sensors, road markings, vehicle maneuver, and the display of oncoming traffic are conceivable as additional displays. In addition, setting of the automatic sensor level, i.e., therefore the range to be monitored by the sensors, is conceivable as a selectable function or on-screen button.

When function group FG4 (temporary events) is selected, a map display with zoom levels Z in steps 4, 5, or 6 can again occur. In addition, temporary events (for example, open air concerts, sporting events, demonstrations, etc.) can be displayed on the map, whereby the events can again be selectable as on-screen buttons via touching of touch screen 11. Here as well, in the case of touching, the showing of a context menu, for example, with the functions "further information" (for example, display of the time period of the current event), "use as navigation module," "show similar POIs," "leave comment," or also "flag for favorites map" would be useful.

Lastly, when selecting the function group FG6 (favorites map), the user is shown a digital map with all map elements that were possibly tagged for the favorites map in relation to other function groups (interaction levels) (see above).

It is conceivable to give the user options as on-screen buttons or functions to alter the appearance (for example, color) of the map or to add the user's new objects (with the option of transferring these to the other map displays of the other function groups). Further, elements can be prioritized and thereby be made more conspicuous on the display. It would also be conceivable to provide the user's generated POIs to other traffic participants (provided that there is a suitable vehicle communication system).

Figure 7:
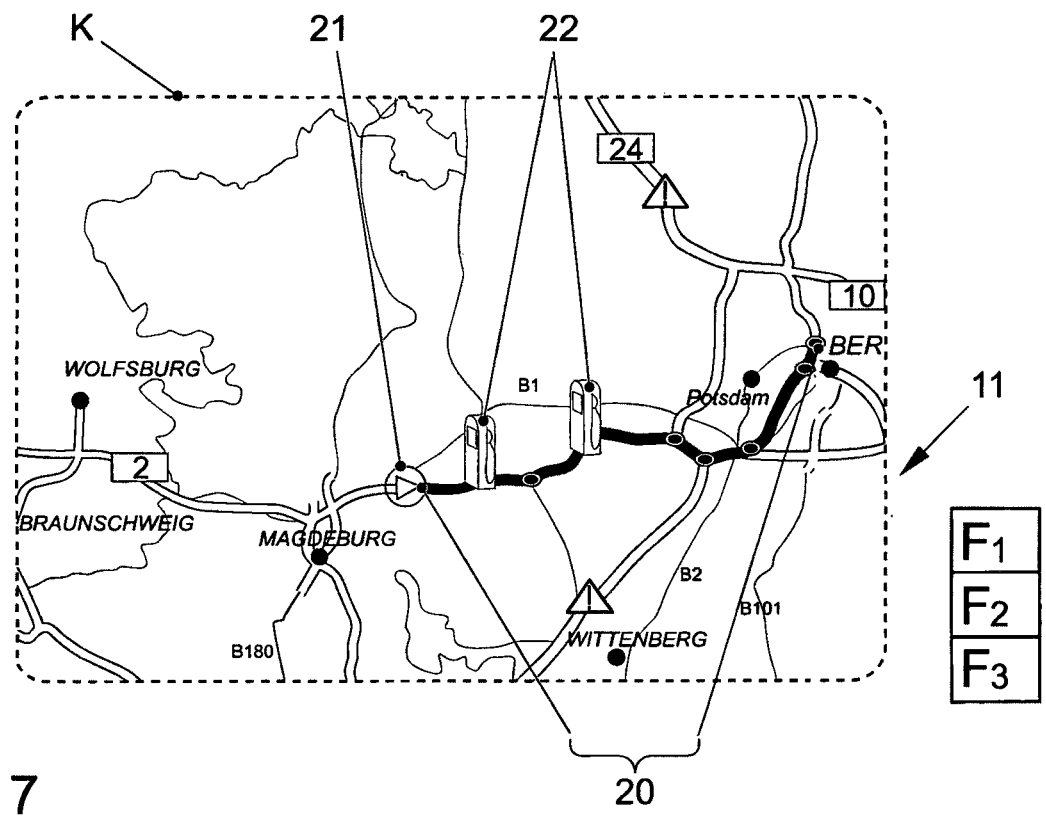
FIG. 7 shows an exemplary illustration of a digital map associated with a specific function group (interaction level)
Figure 8:
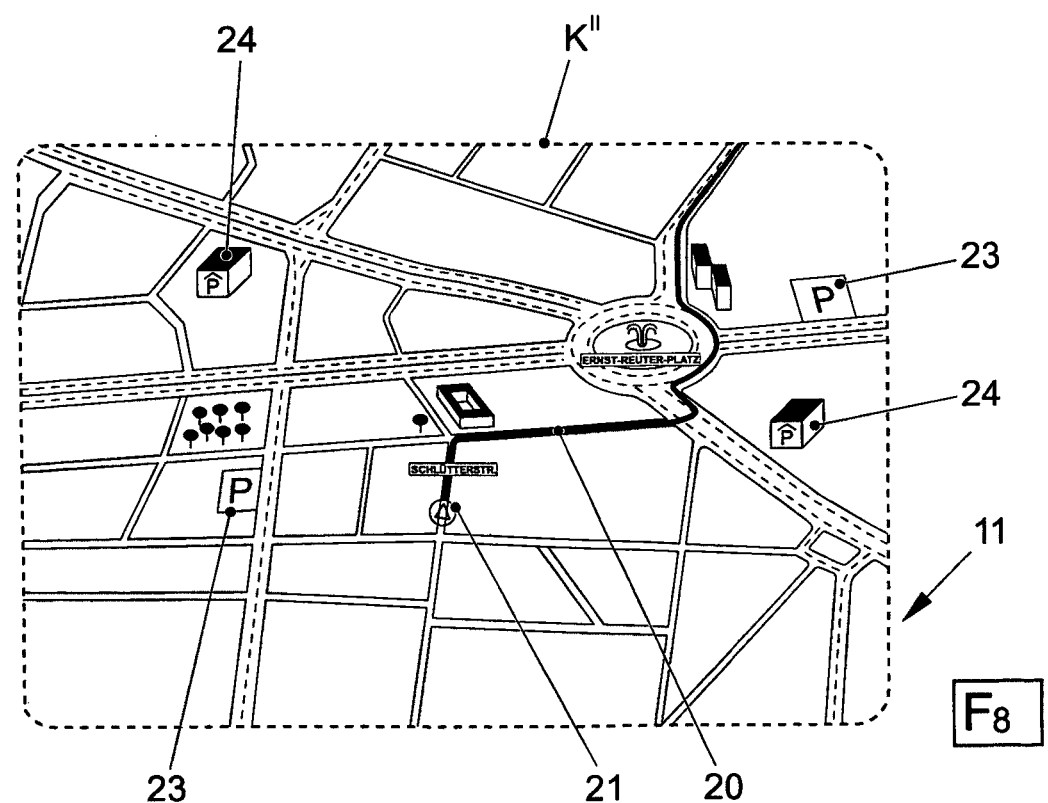
FIG. 8 shows an exemplary illustration of a digital map associated with another function group.

Possible map displays K and K" will now be shown in FIGS. 7 and 8 by way of example; these are associated with function groups or interaction levels FG1 and FG3.

The displays of the user's destination route 20 (with dark background), a cursor 21 of the user's vehicle, and gas stations 22 are visible in FIG. 7. The map K is displayed with a zoom level Z of step 1 and a tilt level N of step 1. In keeping with this is a low detail level D. The selectable functions F1 to F3 on touch screen 11 are indicated in the area of digital map K.

A map display K" with zoom level Z in step 5 and a tilt level N in step 5 is evident in FIG. 8. The detail level D for the landmarks is provided with step 2. Again, cursor 21 of the user's vehicle and the user's destination route 20 can be seen. Further, parking lots 23 or parking garages 24 in the immediate vicinity are indicated.

Now, the function of the already mentioned default button 15 will be described. When this button is pressed, a "deactivation" of functions of a selected function group linked to the digital map occurs. Thus, only the display of a "base map" occurs, which corresponds to a large extent to the map of the current navigation system and contains the following information, inter alia:

Display of the user's vehicle position, display and naming of the currently traveled street, display of the route profile (if available), display of local landmarks (prominent points or buildings) along the route, and display of neighboring and adjacent streets, surrounding areas, and green areas. The display also occurs with a zoom level Z in steps 5 and 6, and in parts also 4.

In the case of a new selection, for example, of function group FG1, for example, by favorites button 12 assigned to this function group, a changeover to a map display K with the corresponding display parameters (particularly zoom level Z and tilt level N in step 1) would take place.

Buttons 12 to 15 are laid out here preferably like "radio buttons," so that the activation of one button leads to the deactivation of another button, more precisely, to the deactivation of the function group or interaction level already activated with the other button. It is assured in this way that always only one interaction level can be activated.

At the same time, buttons 12 to 15 are made as "check boxes," therefore in such a way that another pressing again cancels the activation of a selected function group.

Finally, it should also be noted that certain settings made within a function group can also lead to a permanent display of additional information in the "base map." This can be done, for example, during the selection of a destination or parking lot or other POIs.

Furthermore, it is also conceivable that in the case of certain function groups or interaction levels instructions are automatically activated by the system and displayed on touch screen 11. The display of such an instruction can appear, for example, as a spatially limited window next to the button assigned to the function group or symbol on the display. For example, after a parking space is freed by another driver, whose vehicle is connected via a suitable vehicle communication system to the user's vehicle, a corresponding message could be indicated on touch screen 11. It would be conceivable as another example, when levels fall below a defined minimum fuel tank level or battery charge status, to show this information on the digital map.

As already mentioned, the function groups or interaction levels selectable by the user can be indicated by pressing menu button 16. Moreover, access via this menu to other function groups or interaction levels not yet acquired by the user is conceivable. Such additional function groups or interaction levels could be acquired in the form of small programs, so-called apps (applications), similar to what is already possible today with smartphones. The acquisition of such apps could be possible, for example, by the following methods: (a) Display of a connection symbol, which when pressed creates a link to an online option (app store or the like); and/or (b) display of additional connection symbols for possible function groups or interaction levels whose selection by the user calls up a dialog for acquiring these levels.

It is self-evident in this case that after the acquisition of such additional function groups, they are permanently available to the user and can be selected both via the selection menu (menu button 16) and are also assignable to favorites buttons 12 to 14 in the described manner.

When a function group or interaction level is selected, therefore, one or more parameters of the map display are each adjusted so that the map display is well-suited for the particular possible function selection. In this respect, the corresponding parameters (which are perhaps sellable) in conjunction with an interaction level are saved and are passed on upon their activation to control the map display. Within the scope of the invention, therefore, there is a linking of certain function areas or interaction levels with digital map display parameters.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display and operating device in a motor vehicle, the device comprising:
   a display; and
   a menu screen displayed on the display upon selection of a menu button, the menu screen displaying a plurality of selectable map display function groups, each of the plurality of selectable map display function groups comprising one more map display selectable functions and at least one of the plurality of selectable map display function groups comprises more than one map display selectable functions,
   wherein, when any of the plurality of selectable map display function groups is selected, an associated digital map is displayed on the display with preset display parameters that are different for each of the plurality of selectable map display function groups, the specific display parameters including a zoom level, a tilt level and a detail level,
   wherein the one or more map display selectable functions of a selected map display function group is displayed on the digital map display as an operable icon,
   wherein at least two display parameters have a fixed relationship to one another such that the setting of the one display parameter results at least in an adjustment of the other display parameter,
   wherein the buttons assigned to the selectable map display function groups are designed as freely assignable favorites buttons, and
   wherein an assignment of the freely assignable favorites button occurs via a drag and drop function.

2. The display and operating device according to claim 1, wherein a plurality of selectable functions are displayed in at least one of the selectable map display function groups.

3. The display and operating device according to claim 1, wherein the different selectable map display function groups are configured to be displayed via buttons.

4. The display and operating device according to claim 3, wherein the display has at least one touch-sensitive surface on which buttons assigned to the selectable map display function groups are configured to be displayed by pressing the menu button and activated by touch.

5. The display and operating device according to claim 1, wherein particular selectable functions of a function group are activated by on-screen buttons displayed on a touch-sensitive surface.

6. The display and operating device according to claim 1, wherein the menu screen is devoid of a digital map.

7. The display and operating device according to claim 1, wherein the menu screen only displays selectable map display function groups related to digital maps.

8. The display and operating device according to claim 1, wherein the menu screen only displays the plurality of selectable map display functional groups.

9. The display and operating device according to claim 1, further comprising switches associated with the plurality of selectable map display function groups, the switches comprising buttons on a touchscreen,
   wherein the switches are depictable on the touchscreen by virtue of operation of a menu key in hardware form and are activatable by touch, and
   wherein switches in the form of user-assignable favorites keys and whose assignment is made by means of a drag and drop function are additionally associable with the plurality of selectable map display function groups.

10. The display and operating device according to claim 9, wherein the respective selectable functions of a function group are activatable by buttons depicted on the touchscreen.

11. A display and operator control apparatus in a motor vehicle, which is able to be used at least for displaying information of different driver assistance systems and for selecting functions associated with the driver assistance systems,
   wherein the display and operator control apparatus has a mode of operation in which the display and operator control apparatus displays selectable function groups,
   wherein the function groups each have multiple associated selectable functions associated with one of the driver assistance systems,
   wherein each function group is associated with a map depiction and the map depictions each differ in a value of at least one of their depiction parameters, the depiction parameters including a zoom level, an inclination level and/or a level of detailing, such that after each selection of one of the function groups a digital map depiction having particular depiction parameters, including a particular zoom level, a particular inclination level and a particular level of detailing, is displayed and after the selection of the function group functions from the selected function group are selectable,
   wherein another function group displayed in the mode of operation beforehand can be called up and after another function group is called up simultaneously selectable functions the another function group are displayed and the calling-up of the another function group leads to a change in at least one depiction parameter, including the zoom level, the inclination level and/or the level of detailing, of the digital map depiction,
   wherein the function groups selectable in the mode of operation each have associated switches that are in the form of buttons on a touchscreen, are depictable on the touchscreen by virtue of operation of a menu key in hardware form and are activatable by touch,
   wherein switches that are in the form of user-assignable favorites keys and whose assignment is made by means of a drag and drop function are additionally associable with the function groups, and
   wherein at least two display parameters have a fixed relationship to one another such that the setting of the one display parameter results at least in an adjustment of the other display parameter.

12. The display and operator control apparatus according to claim 11, wherein the respective selectable functions of a function group are activatable by buttons depicted on the touchscreen.

13. The display and operator apparatus according to claim 11, wherein the function groups comprise route planning, point of interest display, parking, events, immediate vehicle environment and a favorites map.

\* \* \* \* \*